United States Patent
de la Iglesia

(10) Patent No.: US 9,424,180 B2
(45) Date of Patent: *Aug. 23, 2016

(54) SYSTEM FOR INCREASING UTILIZATION OF STORAGE MEDIA

(71) Applicant: VIOLIN MEMORY, INC., Santa Clara, CA (US)

(72) Inventor: Erik de la Iglesia, San Jose, CA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,326

(22) Filed: Feb. 10, 2014

(65) Prior Publication Data
US 2015/0032942 A1 Jan. 29, 2015

Related U.S. Application Data

(63) Continuation of application No. 12/759,644, filed on Apr. 13, 2010, now Pat. No. 8,650,362.

(60) Provisional application No. 61/170,472, filed on Apr. 17, 2009.

(51) Int. Cl.
*G06F 3/06* (2006.01)
*G06F 12/02* (2006.01)
*G06F 11/20* (2006.01)

(52) U.S. Cl.
CPC .......... *G06F 12/0246* (2013.01); *G06F 3/065* (2013.01); *G06F 3/0611* (2013.01); *G06F 3/0656* (2013.01); *G06F 3/0659* (2013.01); *G06F 3/0683* (2013.01); *G06F 11/2094* (2013.01)

(58) Field of Classification Search
CPC .......... G06F 12/0246; G06F 11/2094; G06F 3/0611; G06F 3/065; G06F 3/0656; G06F 3/0659; G06F 3/0683
See application file for complete search history.

(56) References Cited

U.S. PATENT DOCUMENTS

| | | |
|---|---|---|
| 6,401,147 B1 | 6/2002 | Sang et al. |
| 6,678,795 B1 | 1/2004 | Moreno et al. |
| 6,721,870 B1 | 4/2004 | Yochai et al. |
| 6,738,865 B1 * | 5/2004 | Burton et al. ................. 711/133 |
| 6,789,171 B2 | 9/2004 | Desai et al. |

(Continued)

OTHER PUBLICATIONS

Friedman et al., Windows 2000 Performance Guide, File Cache Performance and Tuning [reprinted online], O'Reilly Media, Jan. 2002 [retrieved on Oct. 29, 2012], Retrieved from the Internet, http://technet.microsoft.com/en-us/library/bb742613.aspx#mainsection.

(Continued)

*Primary Examiner* — Eric Oberly
(74) *Attorney, Agent, or Firm* — Brinks Gilson & Lione

(57) ABSTRACT

A storage system creates an abstraction of flash Solid State Device (SSD) media allowing random write operations of arbitrary size by a user while performing large sequential write operations of a uniform size to an SSD array. This reduces the number of random write operations performed in the SSD array and as a result increases performance of the SSD array. A control element determines when blocks from different buffers should be combined together or discarded based on fragmentation and read activity. This optimization scheme increases memory capacity and improves memory utilization and performance.

10 Claims, 12 Drawing Sheets

(56) References Cited

U.S. PATENT DOCUMENTS

| | | |
|---|---|---|
| 6,810,470 B1 | 10/2004 | Wiseman et al. |
| 7,017,084 B2 | 3/2006 | Ng et al. |
| 7,089,370 B2 | 8/2006 | Luick |
| 7,110,359 B1 | 9/2006 | Acharya |
| 7,856,533 B2 | 12/2010 | Hur et al. |
| 7,870,351 B2 | 1/2011 | Resnick |
| 7,873,619 B1 | 1/2011 | Faibish et al. |
| 7,975,108 B1 | 7/2011 | Holscher et al. |
| 2002/0035655 A1 | 3/2002 | Finn et al. |
| 2002/0156980 A1* | 10/2002 | Rodriguez .................... 711/136 |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2004/0215923 A1 | 10/2004 | Royer, Jr. |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0162864 A1 | 7/2008 | Sugumar et al. |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0172466 A1* | 7/2009 | Royer et al. ...................... 714/6 |
| 2009/0259800 A1 | 10/2009 | Kilzer et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |

OTHER PUBLICATIONS

Rosenblum et al., The LFS Storage Manager, Proceedings of the 1990 Summer Usenix, 1990, pp. 315-324.

Stolowitz Ford Cowger Listing of Related Cases, Feb. 7, 2012.

* cited by examiner

SYSTEM FOR INCREASING UTILIZATION OF STORAGE MEDIA

RELATED APPLICATIONS

This application is a continuation application of, and claims priority to, application Ser. No. 12/759,644, entitled: SYSTEM FOR INCREASING UTILIZATION OF STORAGE MEDIA, filed on Apr. 13, 2010, which claims priority to provisional application Ser. No. 61/170,472, entitled: STORAGE SYSTEM FOR INCREASING PERFORMANCE OF STORAGE MEDIA, filed Apr. 17, 2009 each of which is incorporated by reference in its entirety.

BACKGROUND

Storage systems typically present a plurality of physical media devices as one or more logical devices with desirable advantages over the original physical media. These advantages can be in the form of manageability (performing per device operations to a group of devices), redundancy (allowing and correcting media errors on one or more devices transparently), scalability (allowing the size of logical devices to change dynamically by adding more physical devices) or performance (using parallelism to spread storage operations over multiple media devices). Additionally, storage systems may employ intelligent operations such as caching, prefetch or other performance-enhancing techniques.

For comparative purposes, storage systems are described in terms of capacity and performance. Capacity is described in terms of bytes (basic unit of computer storage—conceptually equivalent to one letter on a typed page) or blocks where a block is typically 512 Bytes. The number of bytes in a storage system can be very large (several million millions of bytes—or terabytes). Performance of a storage device is typically dependent of the physical capabilities of the storage medium. This performance is typically considered in terms of three parameters: Input/Output Operations per Second (IOPs), throughput (bytes per second that can be accessed) and latency (time required to perform a nominal access). The IOPs metric is further described for both sequential and random access patterns.

Configuration of a storage system allows for selective optimization of capacity and performance. Capacity optimization is achieved by simply aggregating the capacity of all physical devices into a single logical device. This logical device will have higher capacity than the constituent devices but equivalent or slightly lower performance. Reliability optimization may involve using replication that sacrifices half the capacity. Alternatively, reliability optimization may involve some error correction encoding which sacrifices some capacity but less than that from replication. Performance optimization may involve duplication which allows twice as many read operations per unit time assuming some balancing mechanism, striping which increases throughput by spreading operations over an array of devices, or caching which uses memory to act as a buffer to the physical media. In general, the storage system will optimize for a desired performance metric at the cost of another or by incorporating additional physical elements (such as logic, memory or redundancy) beyond the component devices.

Determining the optimal, or most suitable, configuration of a storage system requires matching the demands of the user of the system to the capabilities of the physical devices and the optimization capabilities of the storage system. The performance of the constituent physical devices is typically the determining factor. As an example, common storage systems typically favor IOPs over capacity and thus choose to use a large number of smaller capacity disks vs. creating the equivalent aggregate capacity from larger capacity devices. As media technology evolves, new methods of increasing performance and compensating for shortcomings of the physical media are constantly sought.

A physical media may take the form of Solid State Storage technology known as Multi-Level Cell (MLC) NAND flash. The MLC NAND flash is commonly used in cameras, portable devices such as Universal Serial Bus (USB) memory sticks, and music players as well as consumer electronics such as cellular telephones. Other forms of flash in common use include Single-Level Cell (SLC) NAND flash and NOR flash. Both of these latter types offer higher performance at a significantly higher cost as compared to MLC NAND flash. Many manufacturers are currently offering NAND flash with an interface that mimics that of traditional rotating storage devices (disk drives). These flash devices are referred to as flash Solid State Drives (SSDs) and may be constructed using either MLC or SLC technology.

Flash SSD devices differ from traditional rotating disk drives in a number of aspects. Flash SSD devices have certain undesirable aspects. In particular, flash SSD devices suffer from poor random write performance that degrades over time. Because flash media has a limited number of writes (a physical limitation of the storage material that eventually causes the device to "wear out"), write performance is also unpredictable.

Internally, the flash SSD will periodically rebalance the written sections of the media in a process called "wear leveling". This process assures that the storage material is used evenly thus extending the viable life of the device. The inability to anticipate, or definitively know, when and for how long such background operations may occur (lack of transparency) is a principal cause of the performance uncertainty.

For example, a user cannot typically access data in the flash SSD device while these rebalancing operations are being performed. The flash SSD device does not provide prior notification of when the background operations are going to occur. This prevents an application from anticipating the storage non-availability and scheduling other tasks during the flash SSD rebalancing operations. However, the significant performance advantage of flash SSDs over rotating media in random and sequential read operations makes SSDs ideal media for high performance storage systems, if the write performance issues can be overcome or avoided.

It has also been determined that although the random write performance of the SSDs for a common write operation size of 4 KB (4 thousand bytes or 8 blocks) was poor, the sequential write performance for large write operations above 1 MegaBytes (1 million bytes) was acceptable provided that all writes were of the same size. When always servicing writes of uniform size, the SSD can minimize the amount of background activity.

DETAILED DESCRIPTION

Figure 1:
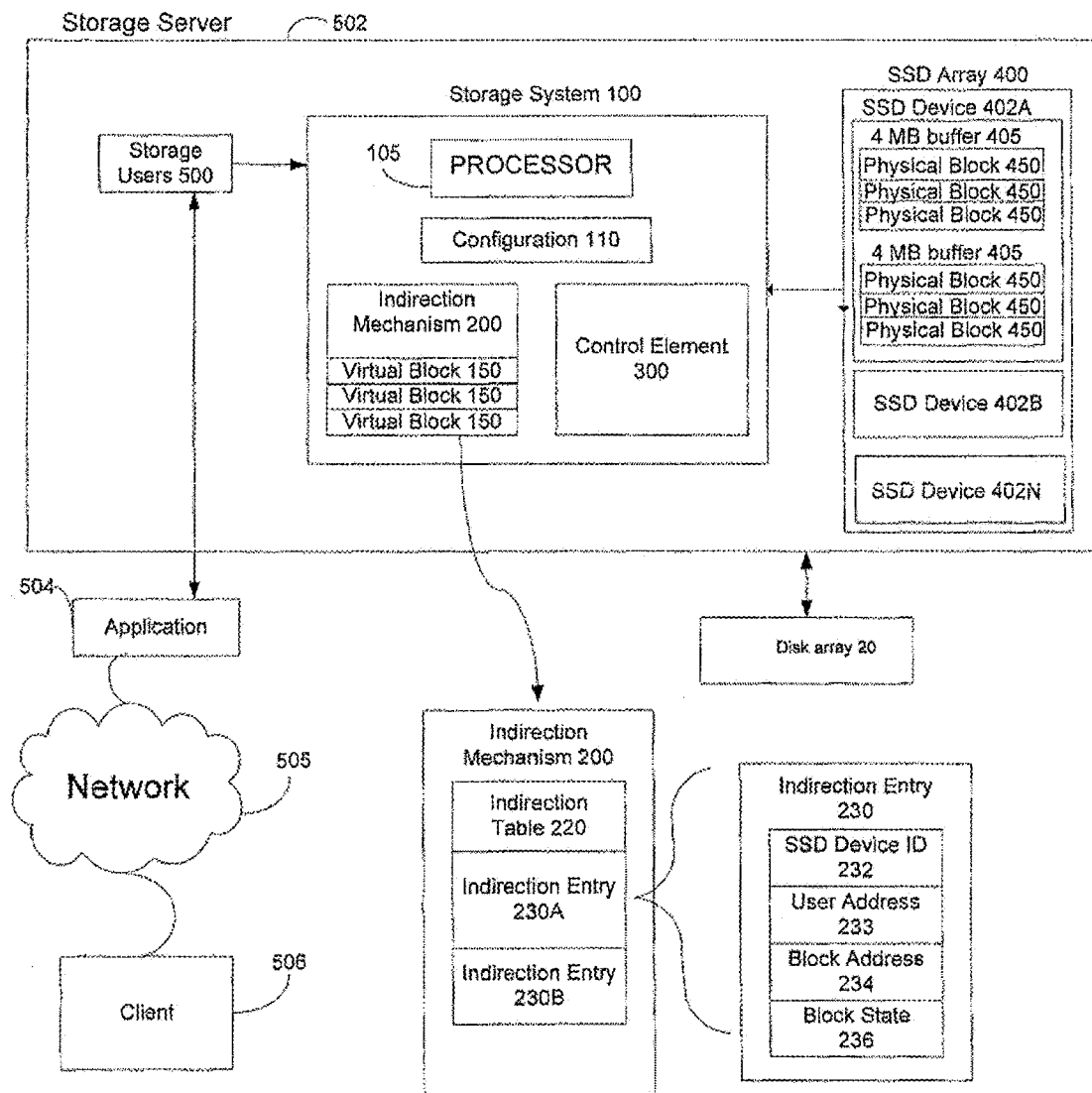
FIG. 1 is a block diagram of a storage system used for accessing a Solid State Device (SSD) array.

A novel storage system includes an indirection mechanism and control element. The storage system creates an abstraction of flash Solid State Device (SSD) media allowing random write operations of arbitrary size by a user while performing large sequential write operations of a uniform size to an SSD array. This reduces the number of random write operations performed in the SSD device and as a result reduces performance degradation in the SSD device. The uniform block writes to the SSD device can also increase storage throughput since the SSD device has to perform fewer defragmentation operations. A defragmentation operation is a type of background activity that can involve a number of internal read and write operations blocking normal user access to the SSD.

The storage system increases storage availability by using transparency and a handshaking scheme that allows users to eliminate or minimize the background operations performed in an SSD array. The storage system also provides the user with the actual physical addresses where data is stored in the SSD array via the indirection mechanism. This is different than conventional SSD arrays where data indirection and the physical addresses for stored data are hidden from the user. Read operations are monitored for each of the different SSD devices in the SSD array. A first SSD device may be read more often than a second SSD device. The storage system may write new data blocks into the second SSD device, even when the second SSD device is currently storing more data than the first SSD device. This can increase throughput in the SSD array for particular applications where data is typically read from memory more often than written to memory.

For example, a web server may provide web pages to clients. New web pages may infrequently be written into memory by the web server. However, the same web server may constantly read other web pages from memory and supply the web pages to clients. Thus, writes to different SSD devices may be performed based on the type of SSD device utilization, not solely on SSD device capacity. An optimal performance balance is reached when all SSD devices experience the same read demand. It is possible, and very likely, that different write loads would be required to achieve this balance.

The storage system can be configured to use different block sizes for writing data into the SSD array according to performance characteristics of the SSD devices. For example, a particular SSD device may be able to perform a single 4 Mega Byte (MB) write significantly faster than 1000 4K block writes. In this situation, the storage system might be configured to perform all writes to the SSD array in 4 MB blocks, thus increasing the total available write throughput of the SSD array. All 4K block writes would have to be pieced together (aggregated) into a single 4 MB write to achieve this increase.

In another embodiment, a control element determines when blocks from different buffers should be combined together or discarded based on fragmentation and read activity. This optimization scheme increases memory capacity and improves memory utilization. Optimizing the combination requires aggregating smaller writes into larger writes without wasting available space within the larger write. Maintaining the information of all smaller writes is the function of the control element.

FIG. 1 shows a storage system 100 that includes an indirection mechanism 200 and a control element 300. The storage system 100 uses the SSD operating characteristics described above to improve storage performance. In one embodiment, the storage system 100 and storage users 500 are software executed by one or more processors 105 and memory located in a server 502. In other embodiments, some elements in the storage system 100 may be implemented in hardware and other elements may be implemented in software.

In one embodiment, the storage system 100 is located between the users 500 and a disk 20. The storage system 100 can be a stand-alone appliance, device, or blade, and the disk 20 can be a stand-alone disk storage array. In this embodiment, the users 500, storage system 100, and disk 20 are each coupled to each other via wired or wireless Internet connections. In another embodiment, the users 500 may access one or more disks 20 over an internal or external data bus. The storage system 100 in this embodiment could be located in the personal computer or server, or could also be a stand-alone device coupled to the computer/client via a computer bus or packet switched network connection.

The storage system 100 accepts reads and writes to disk 20 from users 500 and uses the SSD array 400 for accelerating accesses to data. In one embodiment, the SSD array 400 could be any combination of Dynamic Random Access Memory (DRAM) and/or Flash memory. Of course, the SSD array 400 could be implemented with any memory device that provides relatively faster data access than the disk 20.

The storage users 500 include any software application or hardware that accesses or "uses" data in the SSD array 400 or disk array 20. For example, the storage users 500 may comprise a cache application used by an application 504 operated on a storage server 502. In this example, application 504 may need to access data stored in SSD array 400 responsive to communications with clients 506 via a Wide Area Network (WAN) 505 or Local Area Network (LAN) 505 referred to generally as the Internet.

In one embodiment, the storage users 500, storage system 100, and SSD array 400 may all be part of the same appliance that is located in the server or computing device 502. In another example, any combination of the storage users 500, storage system 100, and SSD array 400 may operate in different computing devices or servers. In other embodiments, the storage system 100 may be operated in conjunction with a personal computer, portable video or audio device, or some other type of consumer product. Of course these are just examples, and the storage system 100 can operate in any computing environment and with any application that needs to write and read date to and from memory devices.

The storage system 100 presents the SSD array 400 as a logical volume to storage users 500. Storage system 100 presents logical blocks 150 of virtual storage that correspond to physical blocks 450 of physical storage in SSD array 400. The SSD array 400 consists of a plurality of SSD devices 402, two of which are referenced as SSD device 402A and SSD device 402B. The total number of SSD devices 402 in SSD array 400 may change over time. While shown being used in conjunction with an SSD array 400, it should also be understood that the storage system 100 can be used with any type or any combination of memory devices.

Storage users 500 may consist of a number of actual users or a single user presenting virtual storage to other users indirectly. For example, as described above, the storage users 500 could include a cache application that presents virtual storage to a web application 504 operating on the web server 502. The logical volume presented to the users 500 has a configurable block size which is considered fixed during the normal operating mode.

The size of the virtual blocks 150, a block size for transfers between the storage system 100 and SSD array 400, and the scheme used for selecting SSD devices 402 is contained within configuration registers 110. Upon initialization, storage system 100 interprets the configuration data in register 110 to set configuration parameters. For the purpose of subsequent examples, the virtual block size 150 is assumed to be configured as 4 KB. Read and write operations performed by storage system 100 reference an integral number of the virtual blocks 150 each of size 4 KB.

The indirection mechanism 200 is operated by the storage users 500 and is populated by the control element 300 with the physical addresses where data is located in SSD array 400. Indirection mechanism 200 consists of an indirection table 220 consisting of a plurality of indirection entries 230, two of which are referenced as indirection entry 230A and indirection entry 230B. In one embodiment, indirection table 220 consists of a block level index representation of a logical storage device. The index representation allows virtual blocks 150 to be mapped to physical blocks 450 in SSD array 400. This requires one entry per virtual block 150 of logical storage or the ability to uniquely map any block of logical storage to a block of physical storage in SSD array 400.

In another embodiment, indirection mechanism 200 consists of a search structure, such as a hash, binary tree or other structure, such that any physical block 450 within the SSD array 400 can be mapped to a unique indirection entry 230 associated with a unique virtual block 150. This search structure may be constructed in situ as the storage media 400 is utilized (written). In this embodiment, indirection table 220 grows as more unique virtual blocks 150 are written to the storage system 100.

In another embodiment, indirection table 220 consists of a multi-level bitmap or tree search structure such that certain components are static in size while other components grow as more unique virtual blocks 150 are created in the storage system 100. In another embodiment, indirection mechanism 200 is implemented as a hardware component or system such as a content addressable memory (CAM). In this embodiment, multiple levels of indirection may be used, some of which are embodied in software.

All embodiments of indirection mechanism 200 resolve a block address of a read or write operation from users 500 into a unique indirection entry 230. The indirection entry 230 consists of a SSD device ID 232, user address 233, block address 234, and a block state 236. The SSD device ID 232 corresponds to a unique SSD device 402 in SSD array 400. Block address 234 corresponds to the unique physical address of a physical block 450 within the SSD device 402 that corresponds with the device ID 232. A block refers to a contiguous group of address locations within the SSD array 400. Block state 236 contains state information associated with block address 234 for device ID 232. This block state 236 may include, but is not limited to, timestamp information, validity flags, and other information.

In one embodiment, device ID 232 and block address 234 correspond to physical SSD devices 402 through a secondary level of indirection. In this embodiment, a disk controller (not shown) may be used to create logical devices from multiple physical devices.

In subsequent description, the choice of blocks of size 4 KB and buffers of size 4 MB is used extensively. The example of a 4 KB block size and 4 MB buffer size is used for explanation purposes. Both block and buffer sizes are configurable and the example sizes used below are not intended to be limiting. Chosen sizes as well as the ratio of sizes may differ significantly without compromising the function of the present embodiments.

Overall Operation

Figure 2:
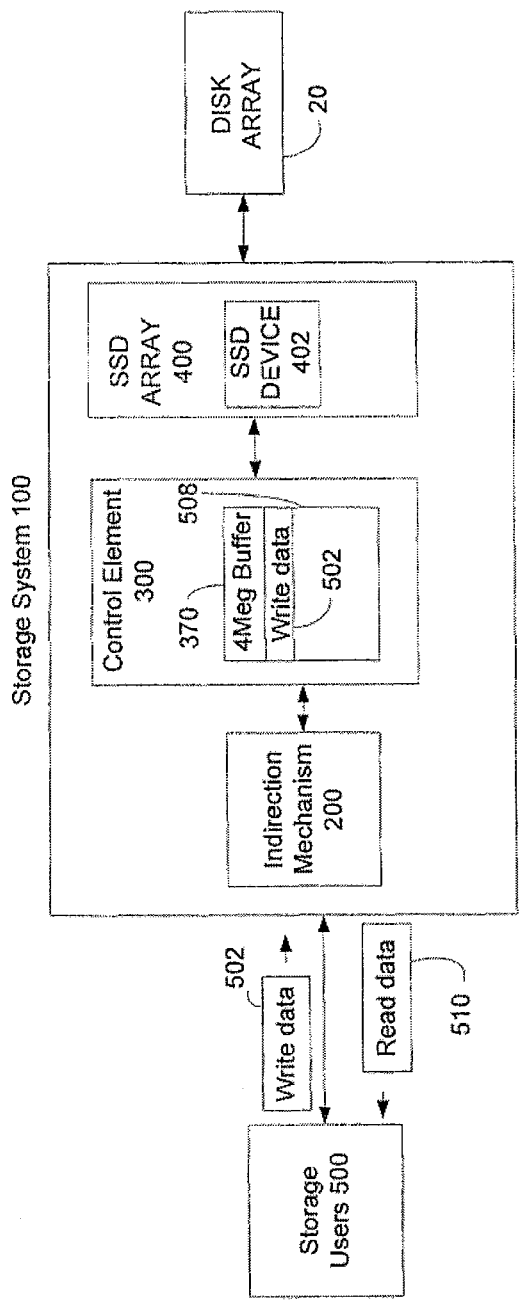
FIG. 2 shows in more detail some of the operations performed by the storage system shown in FIG. 1.
Figure 3:
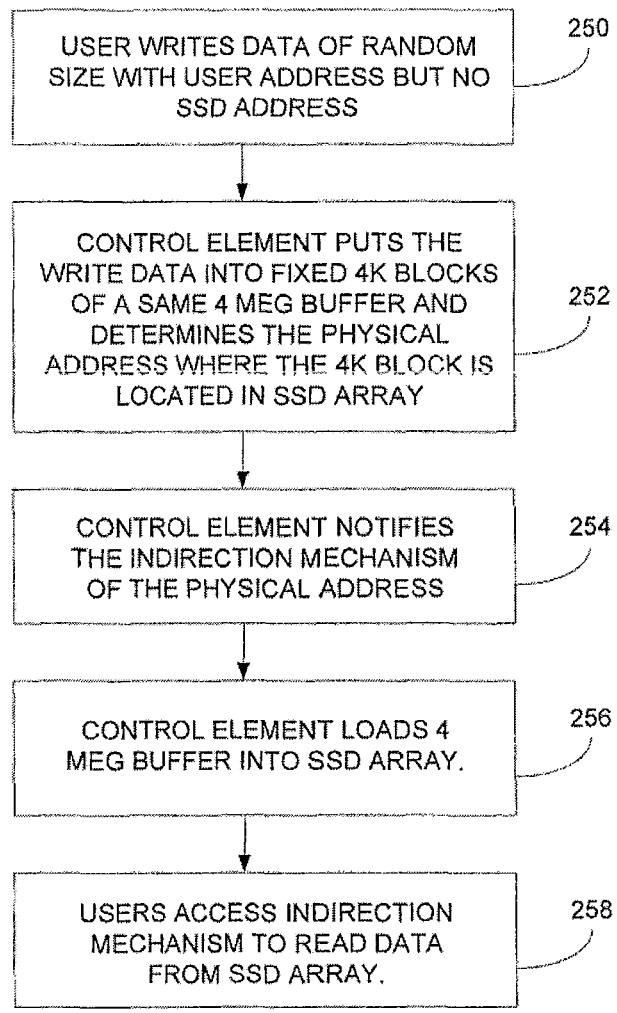
FIG. 3 is a flow diagram showing in more detail how the storage system operates.

FIGS. 1-3 and particularly FIG. 3, in a first operation 250 the storage user 500 writes data 502 of a random size without a specified SSD address to the storage system 100. Data 502 does contain a user address which will used in the future to read data 502. In operation 252, the control element 300 assigns the random write data 502 to one or more 4 KB blocks 508 within a 4 MB staging buffer 370.

The control element 300 also identifies a SSD device 402 within that SSD array 400 for storing the contents of 4 MB buffer 370. The control element 300 in operation 254 notifies the indirection mechanism 200 of the particular SSD device 402 and physical block address where the data 502 is written into the SSD array 400. The user address 233 specified as part of the write of data 502 is stored within indirection mechanism 200 in such a way that a lookup of the user address 233 will return the corresponding physical block address 234. Storage user 500 can subsequently retrieve data 502 using this physical block address. In operation 256, the data 502 in the staging buffer 370 is written into the SSD array 400.

Although the user has not specified an SSD address for data 502, some implementation specific transaction state may exist. In one embodiment, the user submits multiple instances of write data 502 serially, awaiting a returned physical block address for each write and recording this address within a memory. In another embodiment, the user submits several instances of write data 502 concurrently along with a transaction descriptor or numeric identifier than can be used to match the returned physical block address. In another embodiment, the user submits several instances of write data 502 concurrently without a transaction descriptor or numeric identifier and relies on the ordering or responses to match returned physical block addresses.

In subsequent read operations 258, the storage users 500 refer to the indirection mechanism 200 to identify the particular SSD device 402 and physical address in SSD array 400 where the read data 510 is located. Control element 300 reads the physical SSD device 402 referenced by device ID 232 at physical block address 234 and returns the read data 510 to the particular one of the storage users 500.

The control element 300 checks block state 236 and might only perform the read operation if data has been written to the specified physical block 450. A block of some initial state (customarily all '0's) would be returned to the storage user 500 as the result of this invalid read operation. In any embodiment wherein indirection mechanism 200 has no indirection entry 230, a similar block would be returned to the storage user 500 indicating that no writes have occurred for the user address that maps to physical address of the specified physical block 450. The address identified in indirection mechanism 200 is then used by the storage users 500 to read data 510 from the SSD array 400.

Write Operation

Referring to FIGS. 1-4, the storage system 100 accepts write operations of an integral number of blocks from storage users 500 but performs writes to the physical SSD array 400 in large blocks aggregated in staging buffers 370. The optimal size of the staging buffers 370 are determined experimentally and for the purpose of subsequent examples are assumed, through configuration, to be set to 4 MBs. For this configuration, up to 1000 sub-blocks of 4 KBs can be contained within each staging buffer 370. As explained above, performing large 4 MB writes of uniform size from the storage system 100 to the SSD array 400 improves the overall performance of the SSD array 400 since fewer defragmentation operations are required later. As also explained above, a fewer number of larger block writes may increase write throughput compared with a larger number of smaller random block writes.

Figure 4:
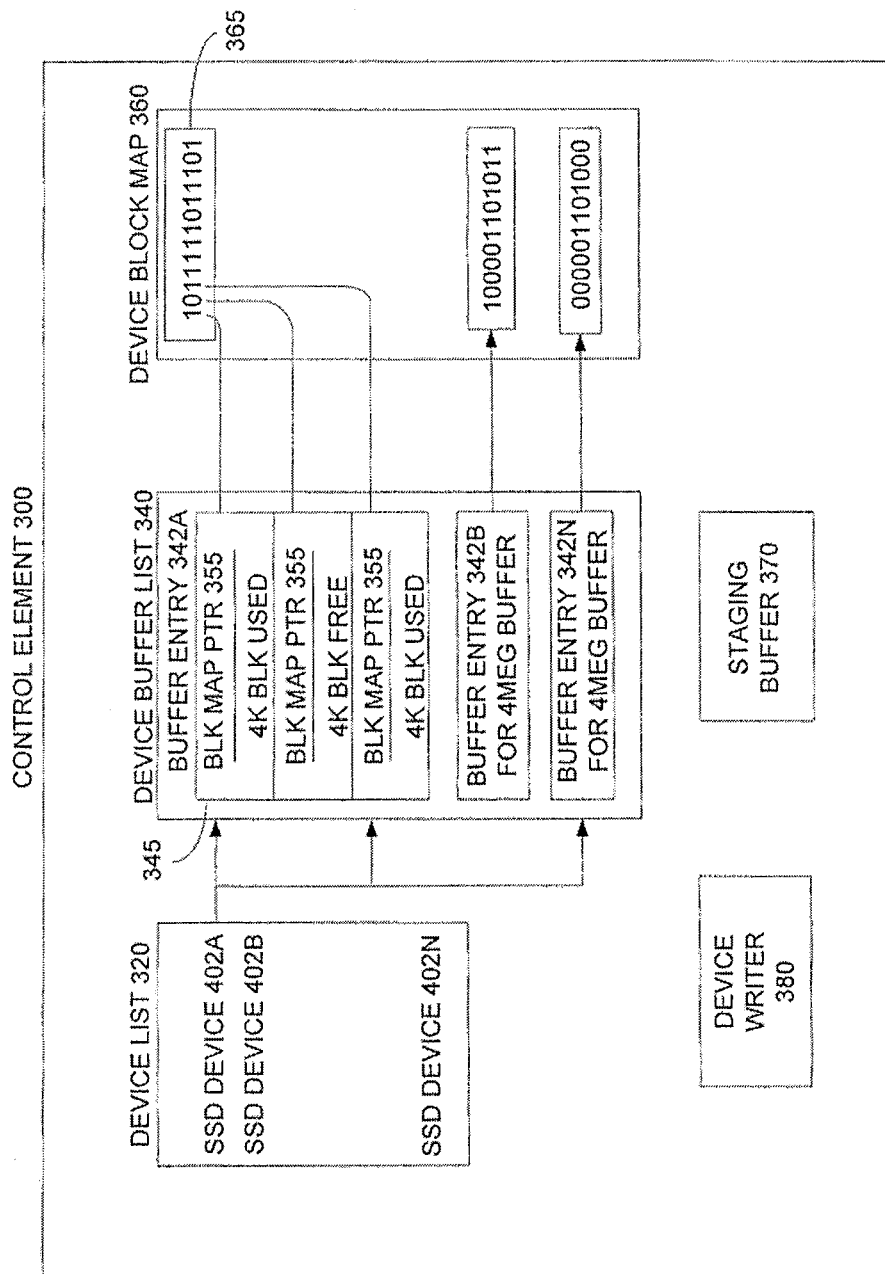
FIG. 4 is a block diagram showing a control element used in the storage system of FIG. 1.

Referring to FIGS. 1 and 4, to service write operations from any member of storage users 500, storage system 100 uses control element 300 to identify the most suitable indirect location for storing data and executes a sequence of operations to perform the write operation and update the indirection table 220.

The control element 300 maintains a device list 320 with information regarding each physical SSD device 402 in SSD array 400. Each physical SSD device 402 has a corresponding device buffer list 340 and a corresponding device block map 360. Control element 300 may consult device list 320 to determine the least utilized physical SSD device 402.

Utilization is considered in terms both of the number of physical blocks 450 used in the SSD device 402 and the number of pending read operations to the SSD devices 402. In one embodiment, the number of read operations to specific 4 MB buffers 405 in the SSD devices 402 over some previous time interval is also considered. This is explained below in FIGS. 10-12. A high read utilization for a particular SSD device 402, such as SSD device 402A in FIG. 1, may cause the control element 300 to select the second SSD device 402B for a next block write, even when SSD device 402A is currently storing less data. In some applications, there are significantly more reads from the SSD devices than writes into the SSD devices. Therefore, evenly distributing read operations may require some SSD devices 402 to store significantly more data than other SSD devices.

Still referring to FIG. 4, after determining the optimal SSD device 402 for writing, control element 300 consults device buffer list 340 associated with the selected SSD device 402. The device buffer list 340 contains a list of buffer entries 342 that identify free 4 MB buffers 405 of storage in SSD array 400. Each buffer entry 342 represents the same buffer size and contains separate block entries 345 that identify the 4 KB blocks 450 within each F MB buffer 405 (FIG. 1). In one embodiment, device buffer list 340 is maintained as a separate structure referenced by the device entries in device list 320.

Device buffer list 340 has sufficient entries 345 to cover the contiguous block space for each device entry 342 in device list 320. Each buffer entry 342 in device buffer list 340 contains minimally a block map pointer 355 that points to a subset of bits 365 in the device block map 360. In another embodiment, the buffer entries 342 may each contain a subset of the bits 365 from the device block map 360 that correspond with a same 4 MB block in the same SSD device 402.

Device block map 360 contains a one to one mapping of 4 KB blocks 450 (FIG. 1) for each buffer entry 342 in device buffer list 340. In this example, for a buffer entry 342 for a 4 MB 405 with 4 KB sub-blocks 450, each device block map 360 contains 1000 bits 365. Each bit 365 represents the valid/invalid state of one 4 KB physical block 450 within a 4 MB physical buffer 450 in SSD array 400. Using the combination of buffer entry 342 and device block map 360, all unused or invalid 4 KB blocks 450 within the selected SSD device 402 for all 4 MB buffers 405 in the SSD array 400 are identified.

Figure 5:
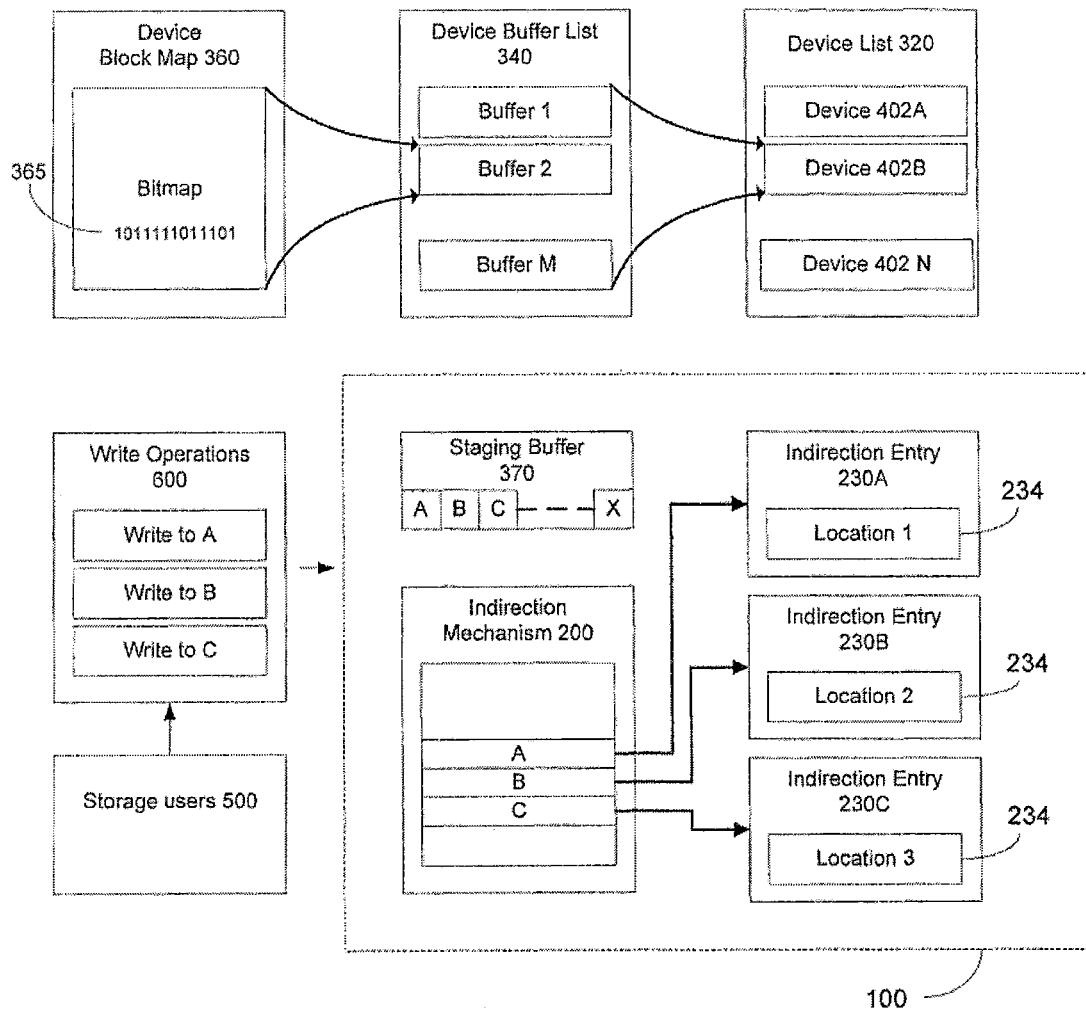
FIG. 5 is a block diagram showing an example write operation performed by the storage system.

Referring to FIG. 5, write operations 600 are submitted to the storage system 100 from one or more of the storage users 500. Staging buffer 370 is selected as the next available buffer for the least utilized physical device. Data for write operations A, B and C are copied into staging buffer 370 which is subsequently written to the SSD array 400 (FIG. 1). The write operations A, B, and C each include data and an associated user address (write address). Other write operations may have occurred after write operation C but before the write by control element 300 to a physical disk in SDD array 400. When the 4 MB write to SSD array 400 is completed, indirection mechanism 200 is updated such that the logical 4 KB blocks A, B and C point to valid indirection entries 230A, 230B and 230C, respectively. These indirection entries maintain the mapping between the user address and the physical block address location 234 in the SSD array 400 where the data A, B, and C is written.

In one embodiment, the block address 234 within each indirection entry 230 is the exact physical address for the written blocks. In another embodiment, physical block addresses 234 are logical addresses derived from the physical address. In another embodiment, block addresses 234 are encoded with the device ID 232 (FIG. 1).

The control element 300 in FIG. 4 does not directly perform writes to the selected SSD devices 402. A copy of the write data is placed in the staging buffer 370 using as much space as necessary. Staging buffer 370 is the same size as the 4 MB buffer entries 405 in the SSD array 400. Thus up to 1000 4 KB block writes can fit inside the staging buffer 370. Each 4 KB write from user 500 causes the corresponding bit 365 in device block map 360 to be set. Multiple bits 365 are set for writes larger than 4 KB.

Staging buffer 370 is written to the physical SSD device 402 in SSD array 400 when the staging buffer 370 is full, nearly full, or a predetermined time has lapsed from the first copy into staging buffer 370. Upon success of the write of the contents of the staging buffer 370 into SSD array 400, the corresponding indirection entry 230 is updated with the physical address location (block address 234) of the data in SSD array 400. The indirection entry 230 is used in subsequent read operations to retrieve the stored data.

To account for race conditions, an acknowledgement of the original write operation is not returned to the user 500 until the physical write into SSD array 400 has occurred and the indirection mechanism 200 has been updated.

In one embodiment, the write data A, B, & C is copied into the staging buffer 370 by control element 300. In another embodiment, staging buffer 370 uses references to the original write operation to avoid the need to copy. In this case, staging buffer 370 maintains the list of links to be used by the write operation to SSD array 400.

Invalidation Operation

Through external factors, storage system 100 may periodically invalidate storage or specific blocks of storage. This invalidation may be spawned by activity such as deletion of data or expiration of cached information initiated by the storage users 500. In one embodiment, the granularity of the invalidation is the same as the granularity of the storage in terms of block size. That is, invalidation occurs in integral number of blocks (each 4 KB from the previous examples).

Invalidation clears the corresponding valid bit 365 in the device block map 360. For a specific storage block 450, device list 320 is consulted for the appropriate device buffer list 340. The physical block address 234 in indirection entry 230 is then used to determine the exact bit 365 in the device block map 360 to clear. Once cleared, the indirection entry 230 is updated to indicate that the entry is no longer valid.

The process of invalidation leaves unused 4 KB gaps within the 4 MB buffers 450 of the SSD devices 402 which constitute wasted space unless reclaimed. However, the entire 4 MB buffer 405 cannot be reclaimed as long as other valid 4K blocks 450 are still stored within that 4 MB buffer 405.

Remapping

To reclaim space freed during invalidation operations without losing existing valid 4 KB blocks 450, control element 300 (FIG. 4) periodically reads all device buffer list entries 342 to determine if multiple 4 MB buffers can be combined. In one embodiment, suitability for combination is determined through a count of the number of valid block entries 345 within each buffer entry 342. Each block entry 345 in a buffer entry 342 corresponds to a 4 KB block 450 within the same 4 MB buffer 405 (FIG. 1). Combining more data from different buffers 405 into the same buffer 405, increases the efficiency and capacity of read and write operations to the SSD array 400.

In a remapping operation, two or more 4 MB buffers 405 are read from the SSD array 400 and the valid 4 KB physical blocks 450 are copied into the same empty 4 MB staging buffer 370. The 4 KB blocks 450 are packed sequentially (repositioned within the 4 MB staging buffer 370) such that any holes created by the invalidated entries are eliminated. When all of the data from one or more 4 MB buffers 405 in SSD array 400 has been read and processed into the same staging buffer 370, the staging buffer 370 is written back into a same new 4 MB buffer 405 on the most suitable SSD device 402, determined again by referring to the device list 320. Upon completion of the write, the associated indirection entries 230 are updated to reflect the new physical address locations for all of the repositioned 4 KB blocks 450. Upon completion of the update, all of the originally read 4 MB buffers 405 can be reused and are made available on the corresponding device buffer list 340.

Remap Control and Optimization

One particular feature of the remapping operation is that a handshaking operation is performed between the storage users 500 and the storage system 100. In one embodiment, the control element 300 of FIG. 4 sends a remap notification message to the storage users 500 prior to remapping multiple different 4 KB blocks 450 from different 4 MB buffers 405 into the same 4 MB buffer 405.

The remap notification message identifies the valid buffer entries 345 that are being moved to a new 4 MB buffer 405. The physical data blocks 450 that are being moved are committed in the new 4 MB buffer 405 in the SSD device 402 prior to the control element 300 sending out the remap notification message to the storage users 500. The storage users 500 then have to acknowledge the remap notification message before the control element 300 can reclaim the 4 MB buffers 405 previously storing the remapped 4 KB data blocks 450.

The storage users 500 acknowledge the remap notification message and then update the indirection entries 230 in indirection mechanism 200 to contain the new device ID 232 and new block addresses 234 for the remapped data blocks 450 (FIG. 1).

Defragmentation in prior SSD devices is typically done autonomously without providing any notification to the storage users. The remapping described above is transparent to the storage users 500 through the handshaking operation described above. This handshaking allows the storage users 500 to complete operations on particular 4 KB blocks 450 before enabling remapping of the blocks into another 4 MB buffer 405.

In one optimization, the staging buffers 370 in FIG. 4 might only be partially filled when ready to be written into a particular 4 MB buffer 405 in SSD array 400. The control element 300 may take this opportunity to remap blocks 450 from other partially filled 4 MB buffers 405 in SSD array 400 into the same 4 MB buffer where the current contents in staging buffer 370 are going to be written.

Similarly as described above, the control element 300 identifies free 4 KB blocks in the new 4 MB buffer 405 via the device buffer list 340. A remap notification message is sent to the storage users 500 for the data blocks 450 that will be copied into the staging buffer 370 and remapped. After the storage users 500 reply with an acknowledgement, all of the contents of the staging buffer 370, including the new data and the remapped data from storage array 400, is written into the same 4 MB buffer 405. This remaps the 4 KB blocks 450 from other sparse 4 MB buffers 405 into the new 4 MB buffer 405 along with any new write data previously contained in the staging buffer 370.

In another optimization, there may not be many write operations 600 currently being performed by the storage users 500. The control element 300 may start reading 4 KB blocks 450 from SSD array 400 for one or more sparsely filled 4 MB buffers 405 into the staging buffer 370. When writes 600 are received, the write data is loaded into the remaining free blocks in the staging buffer 370. All of the contents in the staging buffer 370 are then written into the same 4 MB buffer 405 after the remap acknowledge is received from the storage users 500. The blocks previously read from the sparsely filled 4 MB blocks in the SSD array are then freed for other block write operations.

FIGS. 6-12 describe in more detail examples of how the storage system 100 is used to remap and optimize storage usage in the SSD array 400. As described above, the SSD array 400 is virtualized into 4 MB buffers 405 with 4 KB physical blocks 450. Thus, in this example, there will be 1024 4 KB physical blocks in each 4 MB buffer 405 in the SSD array 400. Of course, other delineations could be used for the buffer size and block size within the buffers.

Figure 6:
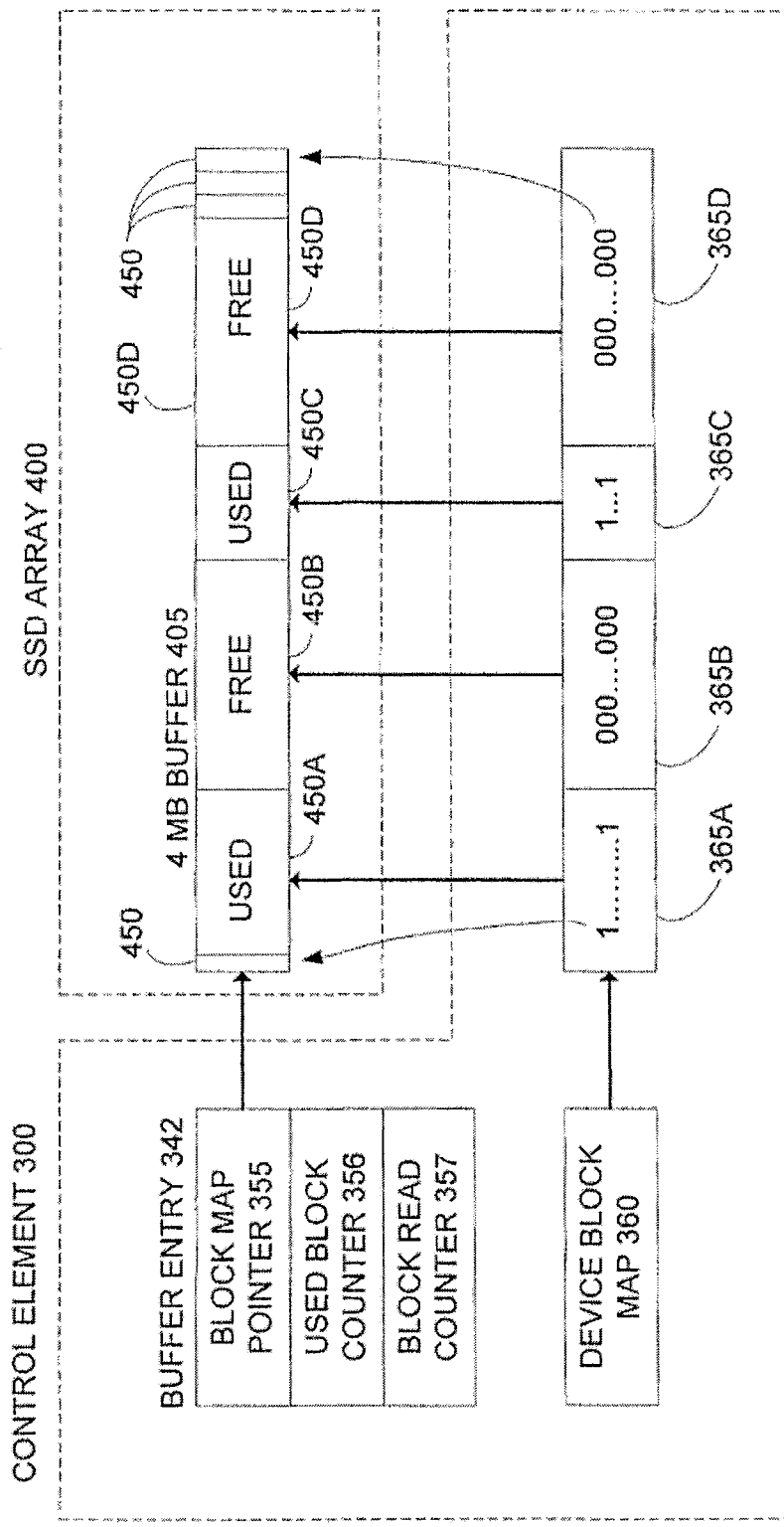
FIG. 6 shows how the control element tracks data utilization.

Referring to FIG. 6, the control element 300 in the storage system 100 maintains a buffer entry 342 for each 4 KB data block 450 in each 4 MB buffer 405 in SSD 400. The buffer entry 342 contains the pointer 355 to the physical location of the 4 MB buffer 405 in SSD array 400. Different combinations of the 4 KB blocks 450 within the 4 MB buffer 405 may either contain valid data designated as used space or may contain empty or invalid data designated as free space.

The control element 300 uses a register counter 356 to track of the number of blocks 450 that are used for each 4 MB buffer 405 and uses a register counter 357 to track the number of times the blocks 450 are read from the same 4 MB buffer 405. For example, whenever a data is written into a previously empty buffer 405, the control element 300 will reset the value in used block count register 356 to 1024. The control element 300 will then decrement the value in used block count register 356 for each 4 KB block 450 that is subsequently invalidated. Whenever there is a read operation to any 4 KB block 450 in a 4 MB buffer 405, the control element 300 will increment the value in a block read count register 357 associated with that particular buffer 405.

The count value in register 357 may be based on a particular time window. For example, the number of reads in register 357 may be a running average for the last minute, hour, day, etc. If the time window where say 1 day, then the number of reads for a last hour may be averaged in with other read counts for the previous 23 hours. If a buffer 405 has not existed for 24 hours, then an average over the time period that the buffer has retained data may be extrapolated to an average per hour. Any other counting scheme that indicates the relative read activity of a particular buffer 405 with respect to the other buffers in the SSD array 400 can also be used.

The device block map 360 as described above is a bit map where each bit indicates whether or not an associated 4 KB data block 450 in a particular 4 MB buffer 405 is used or free. In the example, in FIG. 6, a first group of bits 365A in the bit map 360 indicate that a corresponding first group of 4 KB blocks 450A in 4 MB buffer 405 are used. A second group of bits 365B in the bit map 360 indicate that a corresponding second group of 4 KB blocks 450B in buffer 405 are all free, etc. Again, this is just one example, and the bits 365 can be configured to represent smaller or larger block sizes.

Figure 7:
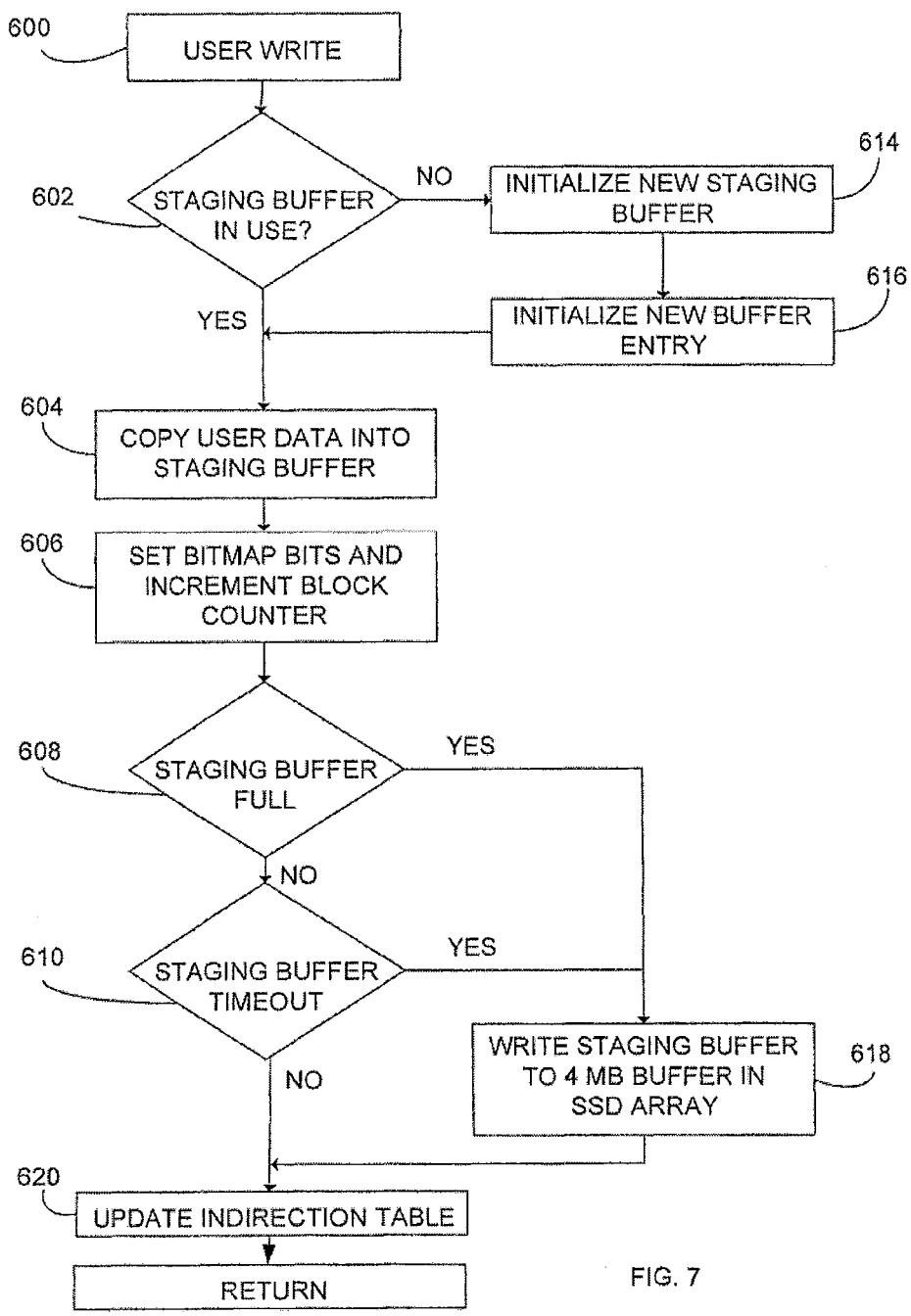
FIG. 7 is a flow diagram showing in more detail the operations performed by the control element during a write operation.

The overall storage system 100 (FIG. 1) performs three basic read, write, and invalidate data activities in SSD array 400. FIG. 7 shows in more detail the write operations performed by the control element 300. In operation 600, the storage system 100 receives a user write operation. The control element 300 determines if there is a staging buffer 370 currently in use in operation 602. If not, the control element 300 initializes a new staging buffer 370 in operation 614 and initializes a new buffer entry 342 for the data associated with the write operation in operation 616.

The control element 300 copies the user data contained in the write operation from the user 500 into the staging buffer 370 in operation 604. The bits 365 in the device block map 360 associated with the data are then set in operation 606. For example, the bits 365 corresponding to the locations of each 4 KB block of data in the 4 MB staging buffer 370 used for storing the data from the user write operation will be set in operation 606. Operation 606 will also increment the used block counter 356 in buffer entry 342 for each 4 KB block 450 of data used in the staging buffer 370 for storing user write data.

If the staging buffer 370 is full in operation 608, the control element 300 writes the data in the staging buffer 370 into an unused 4 MB buffer 405 in the SSD array 400 in operation 618. The control element 300 may also keep track how long the staging buffer 370 has been holding data. If data has been sitting in staging buffer 370 beyond some configured time period in operation 610, the control element 300 may also write the data into the 4 MB buffer 405 in operation 618. The control element 300 updates the indirection table 220 in FIG. 1 to include the SSD device ID 232, user addresses 233, and block addresses 234 for the indirection entries 230 associated with the data blocks 450 written into SSD array 400. The process then returns to operation 600 for processing other write operations.

Figure 8:
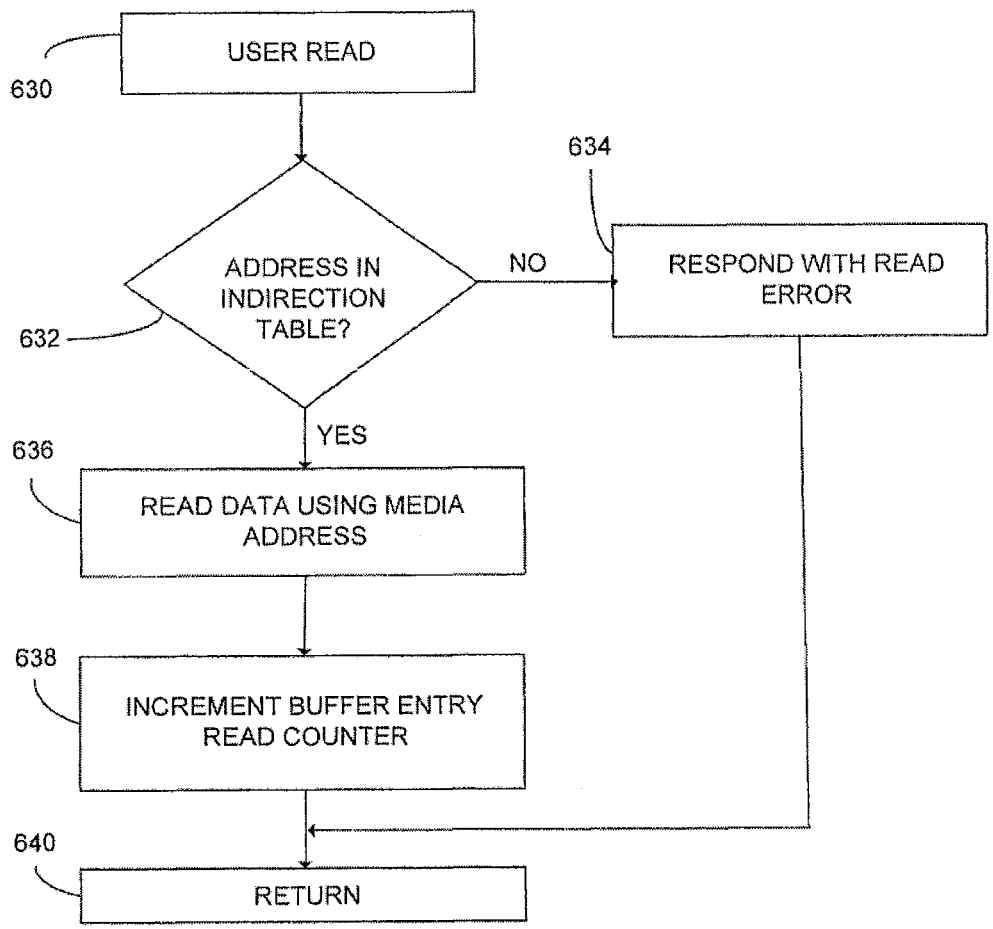
FIG. 8 is a flow diagram showing in more detail the operations performed by the control element during a read operation.

FIG. 8 explains the operations performed by the control element 300 for read operations. In operation 630, the storage system 100 receives a read request from one of the users 500. The control device determines if the user read address in the read request is contained in the indirection table 220. If not, a read error message is sent back to the user in operation 634.

When the read address is located, the control element 300 identifies the corresponding device ID 232 and physical block address 234 (FIG. 1) in operation 632. Note that the physical block address 234 may actually have an additional layer of abstraction used internally by the individual SSD devices 402. The control element 300 in operation 636 reads the 4 KB data block 450 from SSD array 400 that corresponds with the mapped block address 234. The read count value in register 357 (FIG. 6) is then incremented and the control device returns to processing other read requests from the users 500.

Figure 9:
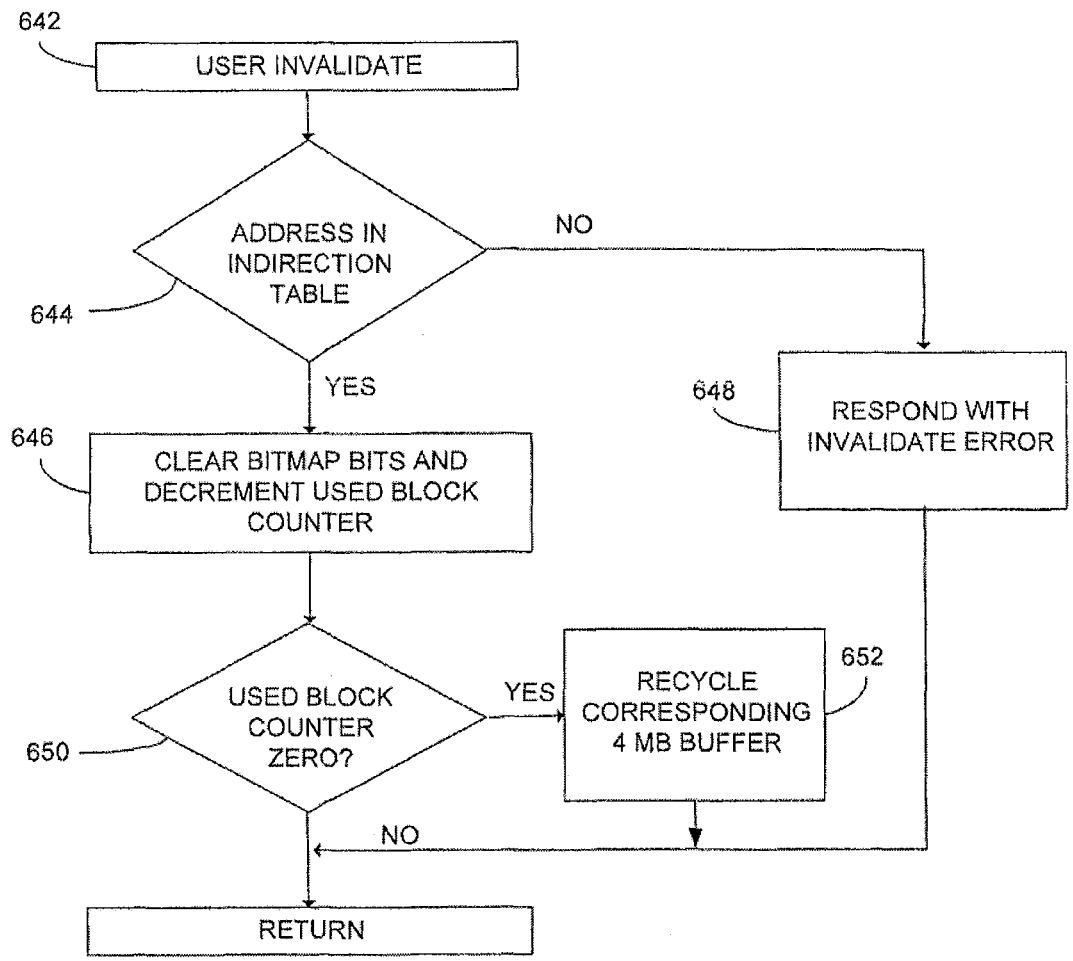
FIG. 9 is a flow diagram showing in more detail the operations performed by the control element during a data invalidate operation.

FIG. 9 shows the operations that are performed by the control element 300 for invalidate operations. The storage system 100 receives an invalidate command from one of the users 500 in operation 642. The control element 300 in operation 644 determines if the user address 233 in the invalidate request is contained in the indirection table 220 (FIG. 1). If not, an invalidate error message is sent back to the user in operation 648.

When the address is successfully located in the indirection table, the control element 300 identifies the corresponding device ID 232 and physical block address 234 (FIG. 1) in operation 644. The control element 300 in operation 646 clears the bits 365 in the device block map 360 (FIG. 6) that correspond with the identified block addresses 234. The used block counter value in register 357 is then decremented once for each invalidated 4 KB block 450. In operation 650, the control element 300 checks to see if the used block counter value in register 356 is zero. If so, the 4 MB buffer 405 no longer contains any valid data and can be reused in operation 652. When the used block counter 356 is not zero, the control element 300 returns and processes other memory access requests.

Figure 10:
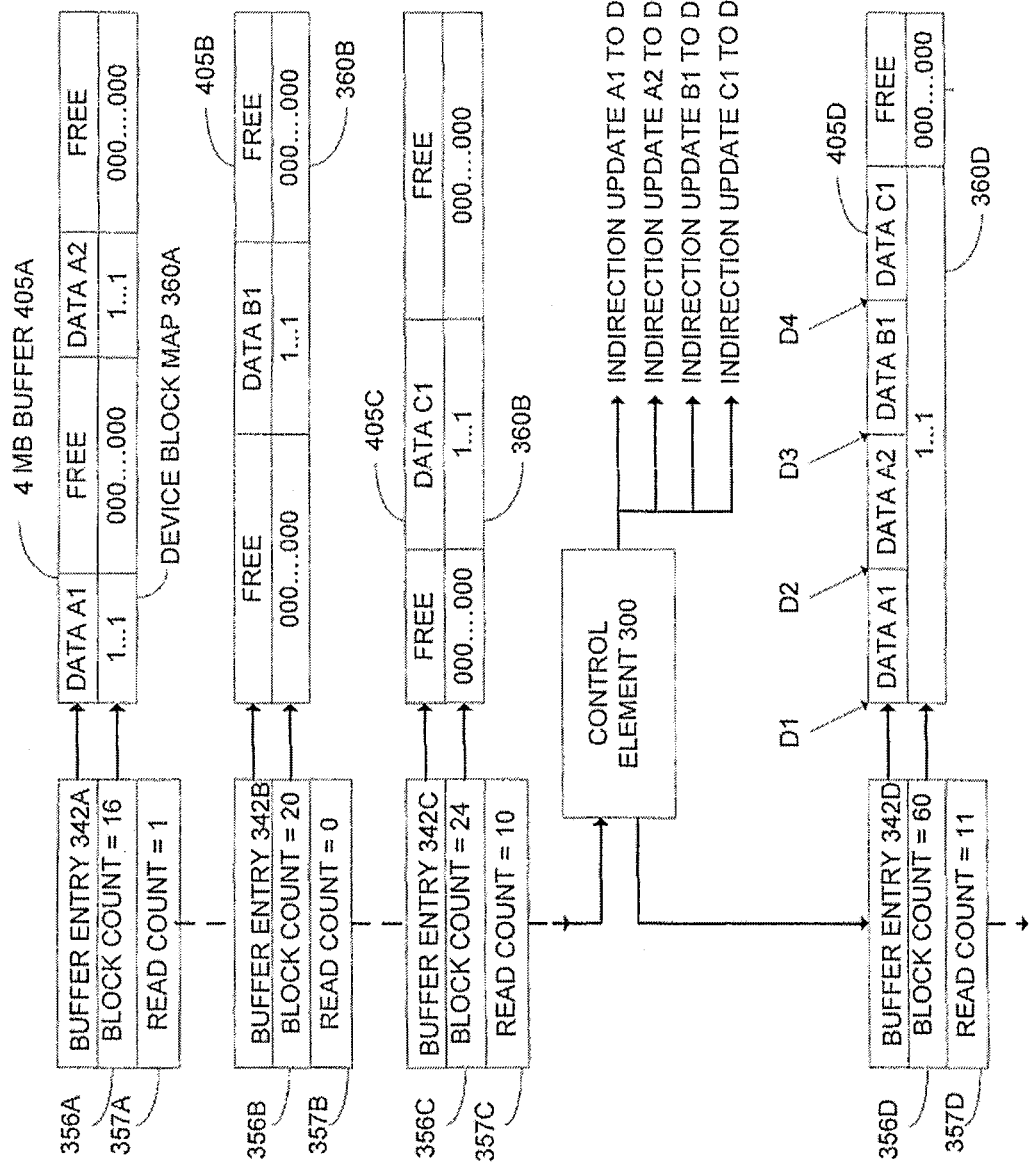
FIG. 10 is a block diagram showing how the control element combines together data from different buffers.
Figure 11:
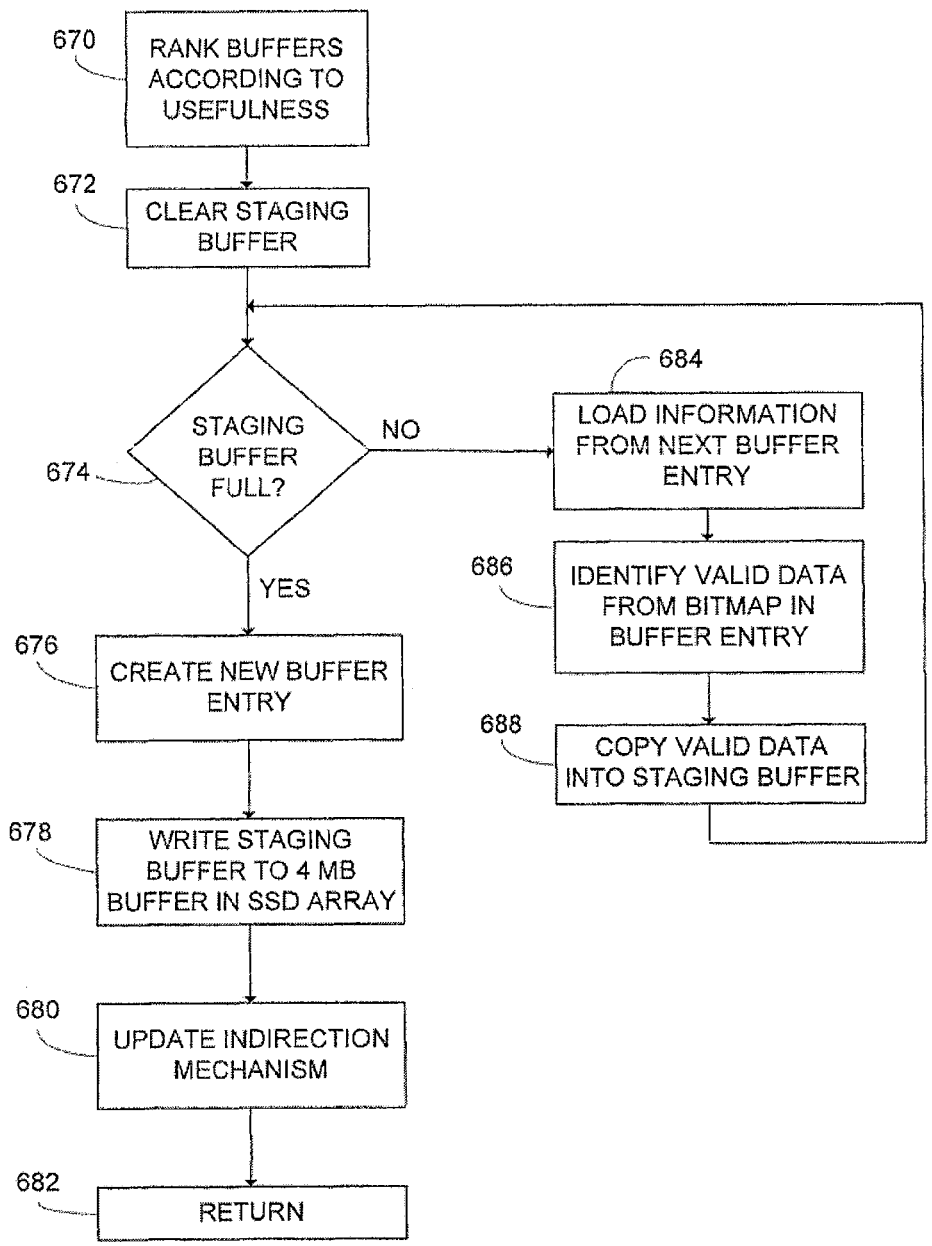
FIG. 11 is a flow diagram showing in more detail the operations performed by the control element in FIG. 10.

FIGS. 10 and 11 show how data from different 4 MB buffers 405 in the SSD array 400 are combined together. Referring first to FIG. 10, three different buffer entries 342A, 342B, and 342C are identified by the control element 300 for resource recovery and optimization. A ranking scheme identifies the best candidate buffers 405 for recover based on the associated used block count value in buffer 356, the read count value in register 357 in the buffer entries 342 and a buffer utilization. One embodiment of the ranking scheme is described in more detail below in FIG. 12.

In this example, the buffer entry 342A associated with 4 MB buffer 405A has an associated block count of 16 and a read count of 1. This means that the valid data A1 and A2 in buffer 405A has a combination of 16 valid 4 KB blocks and has been read once. Sixteen different bits are set in the device block map 360A that correspond to the sixteen 4 KB valid blocks of data A1 and A2.

The buffer entry 342B associated with 4 MB buffer 405B has a block count of 20 and a read count of 0, and the buffer entry 342C associated with 4 MB buffer 405C has an associated block count of 24 and a read count of 10. Similarly, 20 bits will be set in the device block map 360B that correspond to the locations of the twenty 4 KB blocks of data B1 in buffer 405B, and 24 bits will be set in the device block map 360C that correspond to the twenty four 4 KB blocks of data C1 in buffer 405C.

The control element 300 combines the data A1 and A2 from buffer 405A, the data B1 from buffer 405B, and the data C1 from buffer 405C into a free 4 MB buffer 405D. In this example, the data A1 and A2 from buffer 405A are first copied into the first two contiguous address ranges D1 and D2 of buffer 405D, respectively. The data B1 from buffer 405B is copied into a next contiguous address range D3 in buffer 405D after data A2. The data C1 from buffer 405C is copied into a fourth contiguous address range D4 in buffer 405D immediately following data C1.

A new buffer entry 342D is created for 4 MB buffer 405D and the block count 356D is set to the total number of 4 KB blocks 450 that were copied into buffer 405D. In this example, 60 total blocks 450 were copied into buffer 405D and the used block count value in register 356D is set to 60. The read count 357D is also set to the total number of previous reads of buffers 342A, 342B, and 342C. The device block map 360D for buffer 405D is updated by setting the bits corresponding with the physical address locations for each of the 60 4 KB blocks 450 of data A1, A2, B1 and C1 copied into buffer 405B. In this example, the data A1, A2, B1 and C1 substantially fills the 4 MB buffer 405D. Any remaining 4 KB blocks 450 in buffer 405D remain as free space and the corresponding bits in device block map 360D remain set at zero.

The different free spaces shown in FIG. 10 may have previously contained valid data that was then later invalidated. The writes to SSD array 400 are in 4 MB blocks. Therefore, this free space remains unused until the control element 300 aggregates the data A1, A2, B1, and C1 into another buffer 405D. After the aggregation, 4 MBs of data can again be written into 4 MB buffers 405A, 405B, and 405C and the free space reused. By performing contiguous 4 MB writes to SSD array 400, the storage system 100 reduces the overall write times over random write operations. By then aggregating partially used 4 MB buffers 405, the control element 300 improves the overall utilization of the DDS array 400.

Referring to FIG. 11, the control element 300 ranks the 4 MB buffers 405 according to their usefulness in operation 670. Usefulness refers to how much usage the storage system 100 is getting out of the data in the 4 MB buffer 405. Again, ranking buffers will be explained in more detail below in FIG. 12. After the buffers are ranked, one of the staging buffers 370 (FIG. 4) is cleared for copying data from other currently used 4 MB buffers 405. For example in FIG. 10, a staging buffer 370 is cleared for loading data that will eventually be loaded into 4 MB buffer 405D.

In operation 684, the control element 300 reads the information from the buffer entry 342 associated with the highest ranked 4 MB buffer 405. For example, the information in buffer entry 342A and device block map 360A in FIG. 10 is read. The control element 300 identifies the valid data in buffer 405A using the associated buffer entry 342A and device block map 360A in operation 686. The valid 4 KB blocks in buffer 405A are then copied into the staging buffer 370 in operation 688. This process is repeated in order of the highest ranked 4 MB buffers until the staging buffer (FIG. 5) is full in operation 674.

The control element 300 then creates a new buffer entry 342 in operation 676 and sets the used block counter value in the associated register 356 to the total number of 4 KB blocks copied into the staging buffer 370. For example, the control element 300 creates a new buffer entry 342D for the 4 MB buffer 342D in FIG. 10. The control element 300 also sets the bits for the associated device block map 360D for all of the valid 4 KB blocks 450 in the new 4 MB buffer 405D.

In operation 678, the data in the staging buffer 370 is written into one of the 4 MB buffers 405 in the SSD array 400 that is not currently being used. For example, as described in FIG. 10, the aggregated data for A1, A2, B1 and B2 are stored in 4 MB buffer 405D of the SSD array 400. The control element 300 in operation 680 updates the indirection mechanism 200 in FIG. 1 to include a new indirection entry 230 (FIG. 1) that contains the device ID 232 under user addresses 233 and corresponding physical block addresses 234 for each of the 4K blocks in 4 MB buffer 405D. The process then returns in operation 682.

Ranking Buffers

Because the SSD array 400 is used to tier data that is also stored in the disk array 20 (FIG. 1), data in any of the 4 MB buffers 405 can be deleted or "ejected" whenever that data has little usefulness being stored in the SSD array 400. For example, storing data in the SSD array 400 that is seldom read may have little impact in improving the overall read access time provided by the storage system 100 and is therefore less useful. However, storing data in the SSD array 400 that is frequently read could have a substantial impact in reducing the overall read access time provided by storage system 100 and is therefore more useful. Accordingly, the control element 300 may remove data from SSD array 400 that is seldom read and replace it with data that is more frequently read. This is different from conventional SSD devices that cannot eject any data that is currently being used, regardless of the usefulness of the data.

Figure 12:
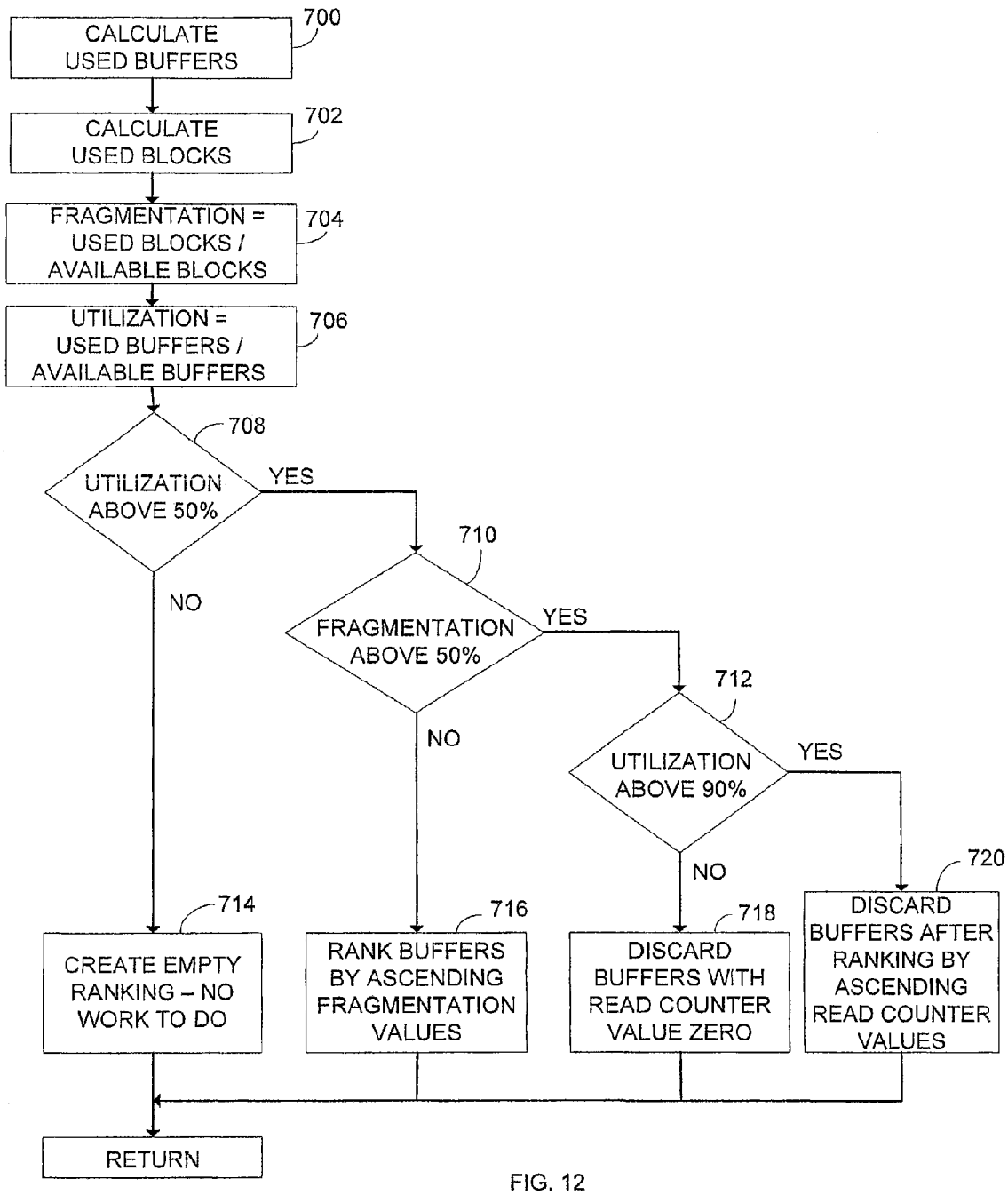
FIG. 12 is a flow diagram showing how the control element ranks utilization of buffers.

FIG. 12 explains a scheme for determining what 4 MB buffers 405 to recover, and the criteria used for determining which buffers to recover first. As explained above, a buffer 405 refers to a 4 MB section of memory in the SSD array 400 and a block 450 refers to a 4 KB section of memory space within one of the 4 MB buffers 405. Of course, the 4 MB buffer size and the 4 KB block size are just examples and other buffer and block sizes could be used.

In operation 700, the control element 300 calculates the number of used buffers 405 in the SSD array 400 by comparing the number of buffer entries 342 with the overall memory space provided by SSD array 400. Operation 702 calculates the total number of 4 KB blocks 450 currently being used (valid) in the SSD array 400. This number can be determined by summing all of the used block counter values in each of the registers 356 for each of the buffer entries 342.

The control element 300 in operation 704 calculates a fragmentation value that measures how much of the SSD array 400 is actually being used. Fragmentation can be calculated globally for all buffer entries 342 or can be calculated for a single 4 MB buffer 405. For example, the number of used blocks 450 identified in operation 702 can be divided by the total number of available 4 KB blocks 450 in the SSD array 400. A fragmentation value close to 1 is optimal, and a value below 50% indicates that at least 2:1 buffer recovery potential exists.

Operation 708 calculates a utilization value that is a measure of how soon the SSD array 400 will likely run out of space. A utilization above 50% indicates the SSD array is starting to run out of space and a utilization above 90% indicates the SSD array 400 in the storage system 100 will likely run out of space soon. The control element 300 determines the utilization value by dividing the number of used 4 MB buffers 405 identified in operation 700 by the total number of available 4 MB buffers 405 in SSD array 400.

If the utilization of the 4 MB buffers is less than 50% in operation 708, no buffer ranking is performed, no buffers are discarded, and no blocks from different buffers are aggregated together in operation 714. In other words, there is still plenty of space in the SSD array 400 available for storing additional data and space is not likely to run out soon.

If the utilization is greater than 50% in operation 708, there is a possibility that the SSD array 400 could run out of space sometime relatively soon. The control element 300 will first determine if the fragmentation value is greater than 50% in operation 710. A fragmentation less than 50% indicates that there are a relatively large percentage of 4 KB blocks 450 within the 4 MB buffers 405 that are currently free/invalid and defragmenting the buffers 405 based on their used block count values in registers 356 will likely provide the most efficient way to free up buffers 405 in the SSD array 400.

In operation 716, the control element 300 ranks all of the 4 MB buffers 405 in ascending order according to their used block count values in their associated registers 356. For example, the 4 MB buffer 405 with the lowest block count value in associated register 356 is ranked the highest. The control element 300 then performs the defragmentation operations described above in FIGS. 10 and 11 for the highest ranked buffers 405. The results of the defragmentation my cause the utilization value in operation 708 to fall back down below 50%. If not, additional defragmentation may be performed.

If the fragmentation value in operation 710 is greater than 50% in operation 710, then defragmenting buffers is less likely to free up substantial numbers of 4 MB buffers 405. In other words, a relatively large percentage of 4 KB blocks 450 within each of the 4 MB buffers 405 are currently being used.

Operation 712 first determines if the utilization is above 90%. If the utilization value is below 90% in operation 712, then the number of 4 MB buffers is running out, but not likely to immediately run out. In this condition, the control element 300 in operation 718 will discard the data in 4 MB buffers 405 that have a read count of zero in the associated registers 357. This represents data in the SSD array 400 that have relatively little use since it has not been used in read operations for a particular period of time.

A utilization value in operation 712 above 90% represents a SSD array 400 that is likely to run out of 4 MB buffers 405 relatively soon. The control element 300 in operation 720 ranks the 4 MB buffers 405 in ascending order according to the read counts in their associated read count registers 357. For example, any 4 MB buffers 405 with a zero read count would be ranked highest and any 4 MB buffers 405 with a read count of 1 would be ranked next highest. The control element 300 than discards the data in the 4 MB buffers 405 according to the rankings (lowest number of reads) until the utilization value in operation 712 drops below 90%.

Note that defragmentation as described above in FIGS. 10 and 11 is favored since data is compacted instead of being lost. If utilization is below 90% the control element 300 can alternatively discard the buffers that have never been read for recovery.

Conventional SSD drives perform defragmentation to improve read access time however the capacity of the SSD drives remain the same. The optimization scheme described above increases memory capacity and improves memory utilization by determining first if data blocks from fragmented buffers can be combined together. When blocks from different buffers cannot efficiently be combined together, data is discarded based on read activity. When the fast storage media begins to run out of space, the data most useful for improving memory access times is kept in the fast storage media while other less useful data is accessed from slower more abundant disc storage media.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Any modifications and variation coming within the spirit and scope of the present invention are also claimed.

The invention claimed is:

1. An apparatus, comprising:
   a storage media having a plurality of buffer regions configured to store copies of data stored in a storage array;
   a staging buffer configured to buffer the data for different write operations;
   a processor configured to aggregate together the data in the staging buffer from the different write operations and store the aggregated data into blocks of a buffer region of the plurality of buffer regions of the storage media;
   wherein the processor is further configured to discard data in blocks of the buffer region having a minimum read count when a number of buffer regions currently being used is below a first threshold number and discard data in the buffer regions according the a ranking of buffer regions when the number of buffer regions currently being used is above a threshold.

2. The apparatus of claim 1, an indirection table configured to map the aggregated data from the write operations to different block regions within a same one of the buffer regions;
   wherein the write operations are each allocated indirection entries within the indirection table and the indirection entries include device identifiers for storage devices in the storage media and physical addresses of the block regions where the data is stored in the storage media.

3. The apparatus of claim 1, wherein a size of the buffer regions and a size of the block regions are configurable.

4. The apparatus of claim 3, wherein the processor is configured to select the size of the buffer regions to increase write throughput to the storage media.

5. The apparatus of claim 1, wherein the processor is configured to aggregate different groups of data for different groups of write operations into a staging buffer and write the different aggregated groups of data from the staging buffer into associated buffer regions within the storage media.

6. The apparatus of claim 1, wherein the indirection table maps random addresses of the write operations into continuous block address locations within the buffer regions.

7. The apparatus of claim 1, wherein the storage media comprises an array of Solid State Devices (SSDs).

8. The apparatus of claim 1, wherein the processor is configured to discard data from the buffer regions and replace the data discarded from the buffer regions with other data from the storage array.

9. The apparatus of claim 8, further comprising block counters containing block count values identifying a number of the block regions in the different buffer regions containing valid data, wherein the processor is configured to discard data from the buffer regions or aggregate data from the different buffer regions together into a same one of the buffer regions according to the block count values.

10. The apparatus according to claim 1, further comprising bit maps for each of the buffer regions, where bits in the bit maps identify a used or unused status for data within associated block regions within buffer regions, and the processor is further configured to combine data from the different buffer regions together into a same one of the buffer regions according to the bit maps.

* * * * *